US005111790A

United States Patent [19]

Grandy

[11] Patent Number: 5,111,790

[45] Date of Patent: May 12, 1992

[54] DIRECT FIRE IGNITION SYSTEM HAVING INDIVIDUAL KNOCK DETECTION SENSOR

[75] Inventor: Mark E. Grandy, Port Huron, Mich.

[73] Assignee: Prestolite Wire Corporation, Farmington Hills, Mich.

[21] Appl. No.: 590,301

[22] Filed: Sep. 28, 1990

[51] Int. Cl.[5] ........................ F02P 5/15; F02P 17/00; G01L 23/22

[52] U.S. Cl. .................................... 123/425; 123/634; 123/635; 123/643; 123/654; 324/380

[58] Field of Search ............... 324/378, 380, 381, 382; 123/426, 635, 643, 654, 169 PA, 169 PH, 634, 425, 435

[56] References Cited

U.S. PATENT DOCUMENTS

| | | | |
|---|---|---|---|
| 3,621,826 | 11/1971 | Chrestensen | 123/643 |
| 4,090,125 | 5/1978 | Warner | 324/399 |
| 4,382,430 | 5/1983 | Iwasaki | 123/637 |
| 4,502,454 | 3/1985 | Hamai et al. | 123/417 |
| 4,547,734 | 10/1985 | Spaude | 324/378 |
| 4,825,844 | 5/1989 | Fasola | 123/634 |
| 4,846,129 | 7/1989 | Noble | 123/635 |
| 4,886,029 | 12/1989 | Lill et al. | 123/630 |
| 5,003,958 | 4/1991 | Yoneyama et al. | 123/635 |

*Primary Examiner*—Tony M. Argenbright
*Attorney, Agent, or Firm*—Remy J. VanOphem

[57] ABSTRACT

A direct fire ignition system for an internal combustion engine having a coil assembly attachable to each spark plug. Each coil assembly has a high voltage transformer for producing a voltage sufficient to cause the spark plug to generate a spark, an integral capacitor parallel with the spark plug, and a spark plug sensor circuit coupling to the high voltage transformer for generating a spark confirmation signal when a spark is generated. The spark sensor circuit is responsive to a high frequency signal generated in the high voltage transformer within a predetermined frequency range to generate the spark confirmation signal. The direct fire ignition system is compatible with single strike or multi-strike modes of operation. The system can also generate a probe voltage across the spark plug to test for auto or pre-ignition.

52 Claims, 5 Drawing Sheets

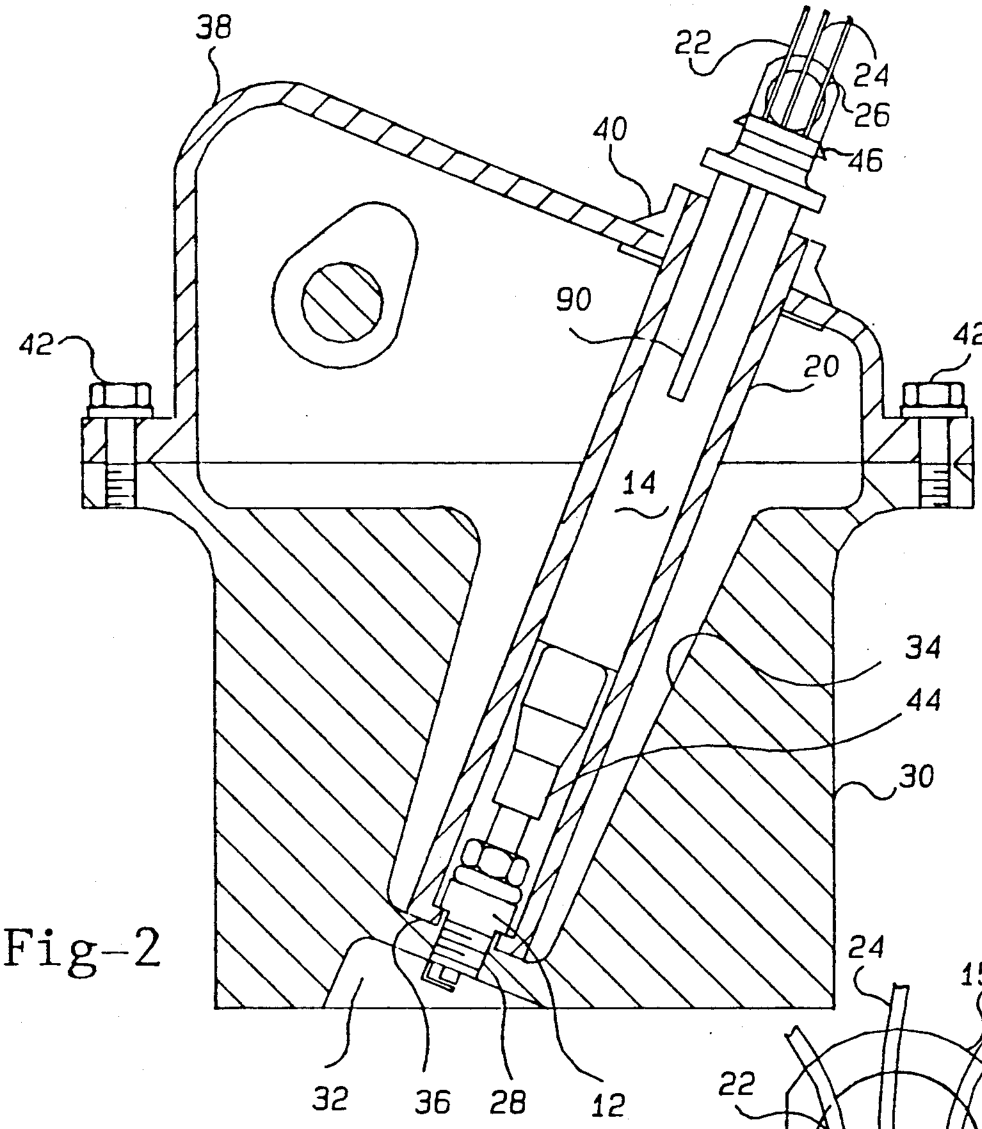
Fig-2
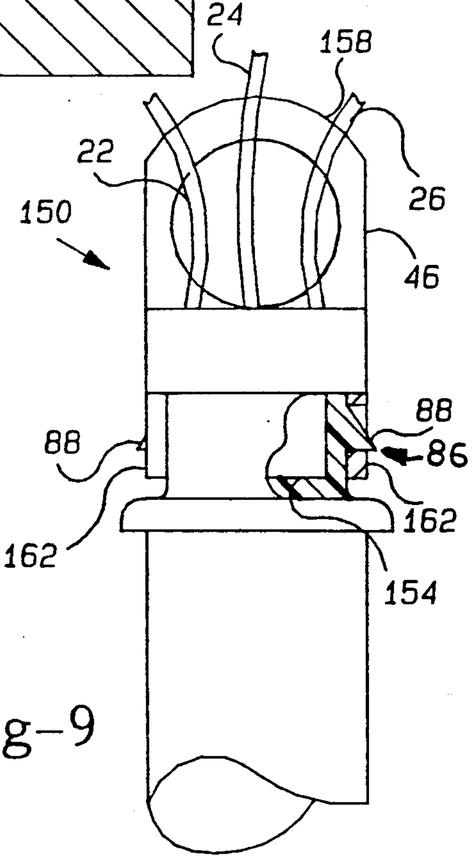
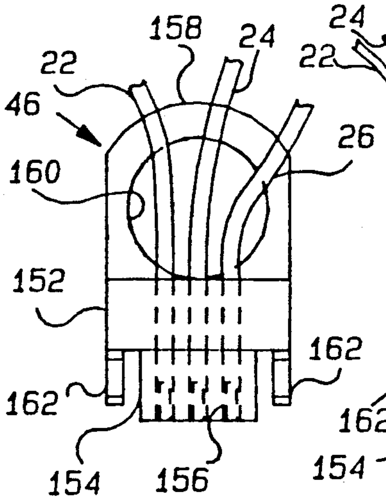
Fig-7
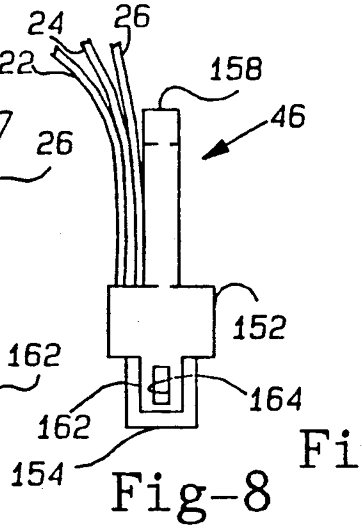
Fig-8
Fig-9

DIRECT FIRE IGNITION SYSTEM HAVING INDIVIDUAL KNOCK DETECTION SENSOR

BACKGROUND OF THE INVENTION

1. Field of the Invention

The invention is related to ignition systems for internal combustion engines and in particular to a direct fire ignition system which includes a sensor which detects the occurrence of a spark generated by the associated spark plug.

2. Description of the Prior Art

Direct fire ignition systems such as taught by Chrestensen in U.S. Pat. No. 3,621,826; Iwasaki in U.S. Pat. No. 4,382,430; Hamai et al in U.S. Pat. No. 4,502,454; and Fasola in U.S. Pat. No. 4,825,844 are known in the art. These direct fire ignition systems have a coil assembly attached directly to each spark plug of the engine. The coil assembly is energized by a relatively low voltage electrical pulse and generates a requisite high voltage sufficient to cause an electrical spark to be generated in the gap between the electrodes of the spark plug. The direct fire ignition systems produce the high voltage at the location of the spark plug eliminating the need for high voltages to be conducted from the distributor to the spark plug and the electrical breakdown problems associated therewith.

Warner in U.S. Pat. No. 4,090,125 discloses a direct fire ignition system in which each coil assembly has a spark sensor indirectly coupled to the secondary coil or output of the high voltage transformer. The sensor may be a sensor rod capacitively coupled to the output of the high voltage transformer or an inductive sensor loop or coil inductively coupled to the output of the high voltage transformer. The signal coupled to the spark sensor is transmitted to a remotely located detector means.

Alternatively, Noble in U.S. Pat. No. 4,846,129 discloses a direct fire ignition system having a high voltage transformer mounted on each spark plug. The primary coil of each high voltage transformer is connected to a shield. The shields are connected to each other and grounded through a common ferrite bead which generates a signal signifying that a spark has been generated. The ferrite bead is located within the driver circuits at a location remote from the high voltage transformers and their associated spark plugs. Noble also teaches the detection of auto-ignition or knock by energizing the high voltage transformer to produce a voltage which is below the voltage required to produce a spark under normal operating conditions within the cylinder, but sufficient to produce a spark when the conditions in the cylinder are conductive to auto or pre-ignition of the air fuel mixture which may be used for engine control and diagnostic purposes.

SUMMARY OF THE INVENTION

The invention is a direct fire ignition system for an internal combustion engine having at least one cylinder, a spark plug associated with the at least one cylinder, and an engine control computer responsive to the operational parameters of the internal combustion engine which generates a fire signal at a time calculated to optimize the ignition of an air fuel mixture in the at least one cylinder by the associated spark plug. The direct fire ignition system has an ignition module responsive to the fire signal generated by the engine control computer for generating an ignition drive pulse signal and a coil assembly mounted directly on the spark plug. The coil assembly has a high voltage generator means for generating a high voltage across the spark plug sufficient to cause the spark plug to generate a spark under normal operating conditions of the engine in response to each ignition drive pulse signal and a spark sensor means for generating a spark confirmation signal in response to a signal within a predetermined frequency range being induced in the high voltage generating means when a spark is generated by the spark plug. The predetermined frequency range uniquely identifies that a spark has been generated by the spark plug.

The primary object of the invention is an ignition system having no high voltage leads between the distributor and the spark plug.

Another object of the invention is an ignition system in which the high voltage transformer is attached directly to the external end of the spark plug.

Another object of the invention is to detect the occurrence of a spark being generated by the spark plug.

Another object of the invention is the detection of a high frequency signal in a predetermined frequency range to determine the occurrence of a spark.

Another object of the invention is to detect when the conditions inside the engine's cylinder are conductive to pre-ignition.

Still another object of the invention is to generate a high voltage lower than the voltage required for the spark plug to generate a spark under normal operating conditions within the engine's cylinders yet sufficiently high for a spark to be generated when the conditions in the cylinders are conductive to pre-ignition or knock.

Still another object of the invention is to transmit the spark confirmation signal to the engine control computer for diagnostic and engine control purposes.

These and other objects of the invention will become more apparent from a reading of the detailed description of the invention in conjunction with the drawings.

BRIEF DESCRIPTION OF THE DRAWINGS

FIG. 2 is a cross-sectional view of an engine head showing the mounting of the coil assembly on a spark plug;

FIG. 7 is a front view of the coil assembly extraction tool;

FIG. 8 is a side view of the coil assembly extraction tool;

FIG. 9 is a partial cross section showing the attachment of the extraction tool to the coil assembly.

DETAILED DESCRIPTION OF THE PREFERRED EMBODIMENT

Figure 1:
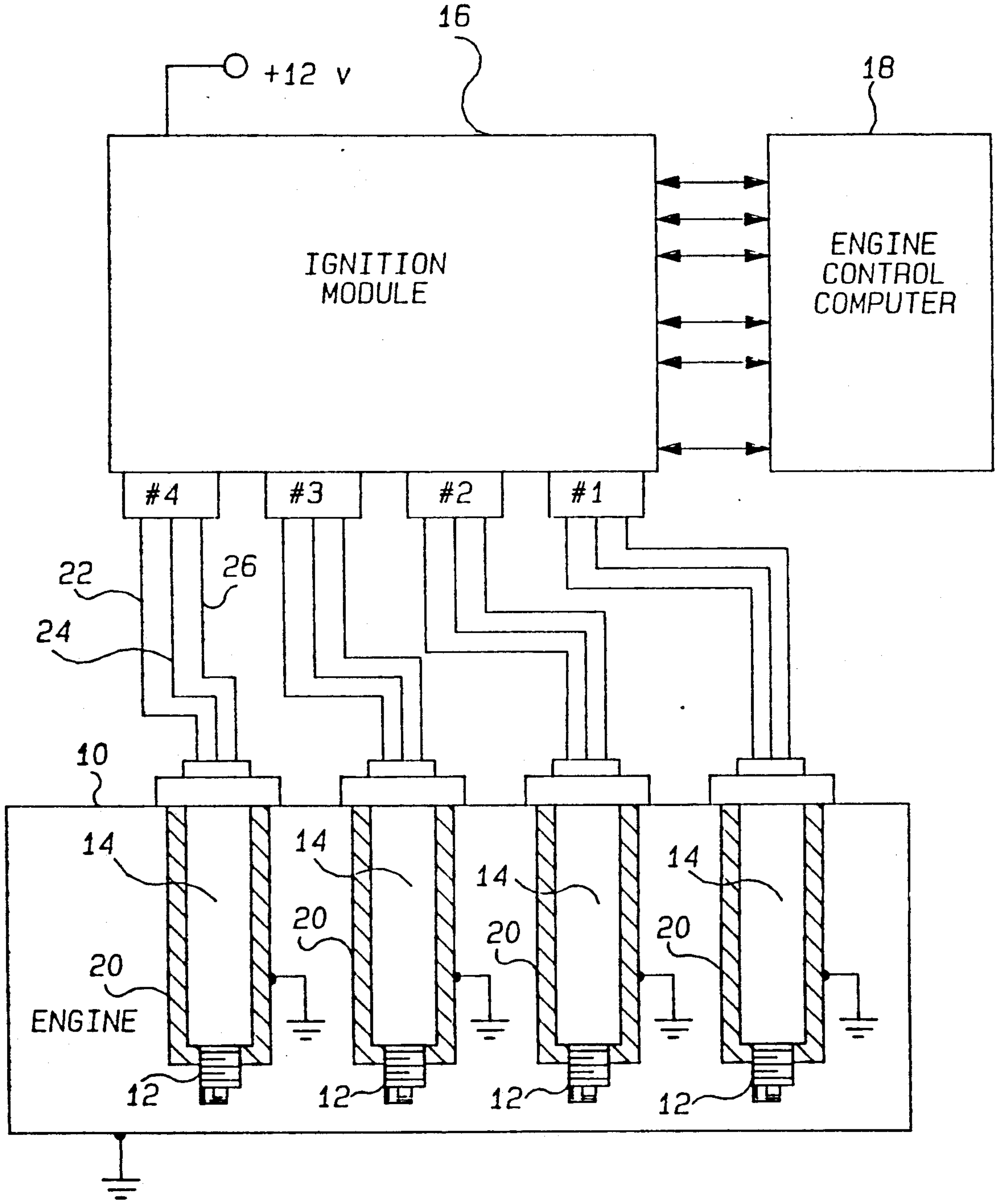
FIG. 1 is a block diagram showing the relationship of the major components of the direct fire ignition system to each other and the engine's spark plugs.

FIG. 1 is a block diagram of the direct fire ignition system for an internal combustion engine 10. For purposes of explanation, the engine 10 has, for example, four cylinders (not shown) and each cylinder has its own spark plug 12 as shown. A coil assembly 14 is individually mounted on each spark plug 12 and produces a high voltage or electrical potential across the electrodes of the spark plug 12 under the control of an ignition module 16. The selection of the spark plug 12 to be energized and the timing when the selected spark plug 12 is to be energized is controlled by an engine control computer 18 through the ignition module 16. The engine control computer 18 is of conventional design and is of the type used in the automotive industry for controlling the operation of fuel injected internal combustion engines.

Each coil assembly 14 is circumscribed by a cylindrically shaped metal shield 20 which is grounded to the engine as shown. The metal shield 20 is normally part of the engine as supplied by the manufacturer. The metal shield 20 cooperates with a conductive electrode disposed within its associated coil assembly 14 to form a high voltage capacitor across the electrodes of the spark plug 12, as shall be described in greater detail later on. The coil assembly 14 includes a high voltage pulse transformer for generating the high voltage required to cause the spark plug 12 to produce an electrical spark and a spark detection circuit which generates a spark confirmation signal each time a spark actually occurs. The spark confirmation signal is transmitted back to the engine control computer 18 through the ignition module 16 and may be used for control or diagnostic purposes.

As shown in FIG. 1, each coil assembly 14 is connected to the ignition module 16 by three non-shielded connector wires 22, 24, and 26. Because the potentials carried by these three wires is relatively low, the probability of electrical breakdown of these wires is significantly less than the probability of electrical breakdown of the high voltage ignition wire of conventional automotive ignition circuits.

FIG. 2 shows the details of mounting the spark plug 12, the coil assembly 14, and the metal shield 20 on a head 30 of an overhead cam internal combustion engine. The spark plug 12 is threadably received through a threaded bore 28 provided in the head 30 and extends into the combustion chamber 32. The threaded bore 28 is provided at the bottom of a well 34 adapted to receive the spark plug 12. The metal shield 20 has an annular base 36 which has an aperture which circumscribes the threaded bore 28. The annular base 36 is clamped between the surface of the head 30, at the bottom of the well 34, and a shoulder provided on the spark plug 12 as shown. Alternatively, the end of the metal shield 20 may be threaded and threadably attached to the head of the engine rather than being captured by the spark plug 12 as shown in FIG. 2. As is known in the art, the head 30 is mounted on the top of an engine block (not shown) and encloses the top portions of the cylinders.

The metal shield 20 extends through an aperture provided in a valve cover 38 so that the coil assembly 14 and the spark plug 12 may be mounted or removed from the head 30 without having to remove the valve cover 38. A resilient annular seal 40 which prevents dirt from entering and oil from escaping from the space between the engine head 30 and the valve cover 38 is provided. The valve cover 38 is mounted on the engine head 30 using a plurality of fasteners such as bolts 42 received in mating threaded bores provided in the engine head 30.

One end of the coil assembly 14 has a rubber boot 44 which sealingly engages the ceramic post of the spark plug 12 which projects inside the metal shield 20. A three pin male electrical connector 86 (see FIG. 3) is provided on the other end of the coil assembly 14 to which a mating female electrical connector 46 is connected as shown. The connector wires 22, 24, and 26 are connected between the female electrical connector 46 and the ignition module 16.

Figure 3:
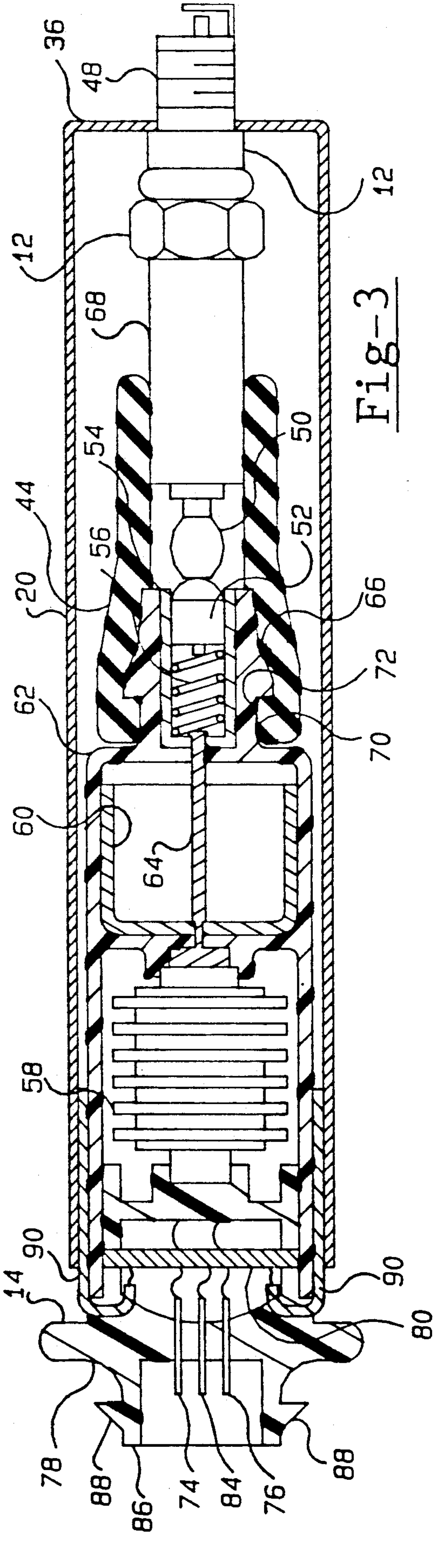
FIG. 3 is a cross-sectional view showing the details of the coil assembly.

FIG. 3 shows the structural details of the coil assembly 14 relative to the spark plug 12 and the metal shield 20. As previously described, the coil assembly 14 is circumscribed by the metal shield 20 which has the annular base 36 through which a threaded portion 48 of the spark plug 12 protrudes. An electrical terminal 50 of the spark plug 12 is engaged by a resiliently biased electrical contact 52 which extends from one end of the coil assembly 14. The electrical contact 52 is disposed in a metal cup 54 and is biased towards the spark plug 12 by a coil spring 56. The metal cup 54 is connected to the output terminal of a high voltage transformer or coil 58 and a metal electrode 60 deposited on the inner surface of a plastic housing 62 by an axially disposed conductor rod 64. The metal electrode 60 in combination with the metal shield 20 forms a high voltage capacitor 95, shown in FIG. 5, which is connected between the high voltage output of the high voltage transformer 58 and grounded in parallel with the electrodes of the spark plug 12. This high voltage capacitor 95 has a normal capacitance of approximately 35 pF.

The plastic housing 62 has an axially extending nipple 66 which circumscribes and supports the metal cup 54. The rubber boot 44 which sealingly engages a ceramic insulator 68 of the spark plug 12 is attached to the axially extending nipple 66 and shields the electrical contact between the electrical terminal 50 of the spark plug 12 and the electrical contact 52 from dirt and moisture. The axially extending nipple 66 has an annular recess 70 which lockingly receives a mating annular rib 72 provided at the end of the rubber boot 44 to lock the rubber boot 44 to the plastic housing 62.

Figure 5:
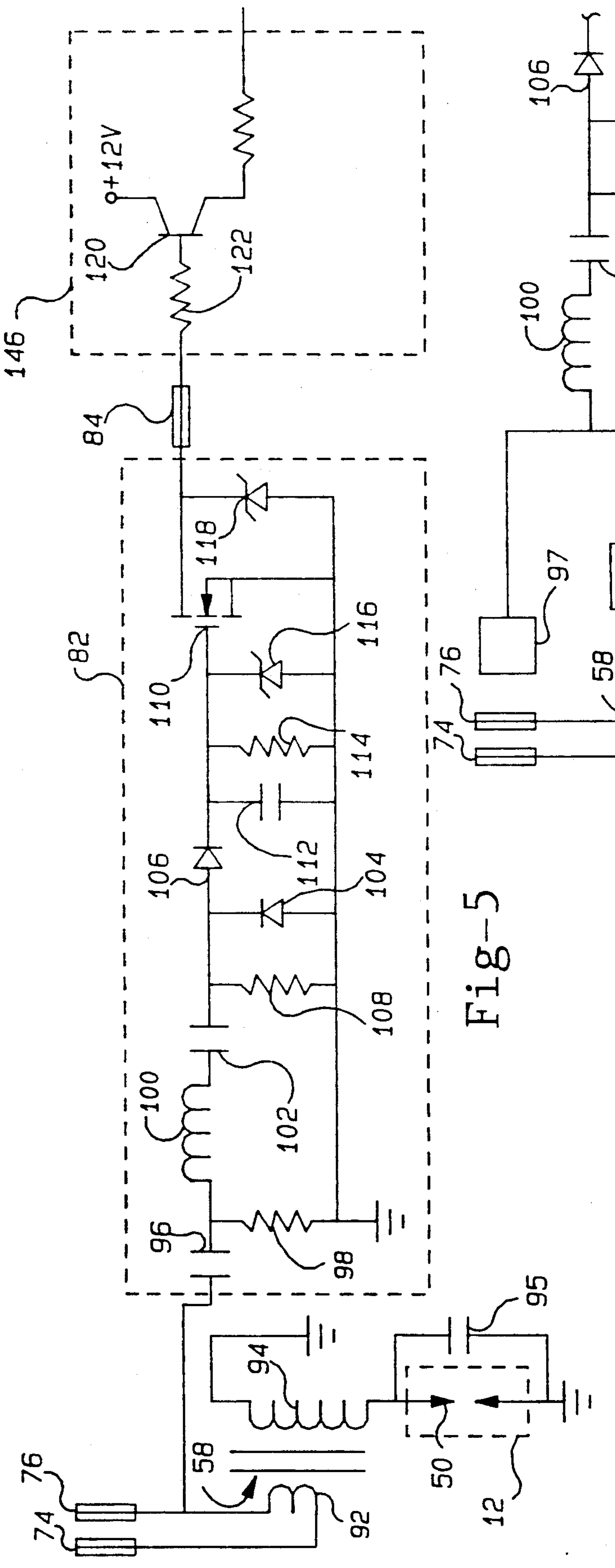
FIG. 5 is a circuit diagram showing the details of the electrical circuit within the coil assembly.

The high voltage transformer 58 has a primary coil 92 and a secondary coil 94 as shown in FIG. 5. The ends of the primary coil 92 are connected to connector pins 74 and 76 provided in an end cap 78. One end of the secondary coil 94 is connected to ground via the metal shield 20 and the other end of the secondary coil 94 is connected to the electrical terminal 50 of the spark plug 12 via the conductor rod 64, metal cup 54, and electrical contact 52.

Figure 4:
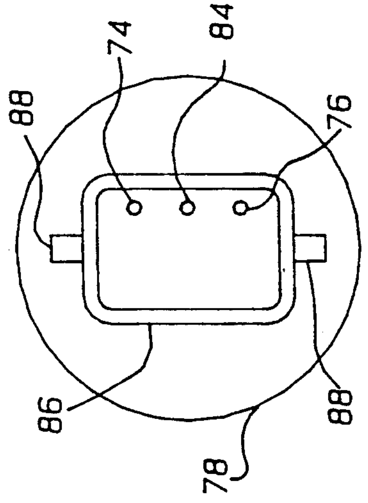
FIG. 4 is an end view of the coil assembly showing the arrangement of the terminal pins in the electrical connector.

A sensor circuit board 80 is mounted in the plastic housing 62 adjacent to the end cap 78 which encloses the plastic housing 62 at the end opposite the axially extending nipple 66. A sensor circuit 82, shown in FIG. 5, is disposed on the sensor circuit board 80. The output of the sensor circuit 82 is connected to a connector pin 84. The external portion of the end cap 78 is molded to form the male electrical connector 86 which mates with the female electrical connector 46 as shown in FIG. 9. The male electrical connector 86 has a generally rectangular shape, as shown in FIG. 4, and has two dogs 88 which are engaged by the mating portion of the female electrical connector 46 to lock onto the end of the coil assembly 14.

Preferably, one or more ground spring fingers 90, as best shown in FIG. 2, are provided along the external surface of the coil assembly 14 which engages the metal shield 20. The spring fingers 90 are electrically conductive and provide an electrical ground within the coil assembly 14 for the secondary coil 94 and the sensor circuit 82.

The details of the electrical circuits within the coil assembly 14 are shown in FIG. 5. As previously indicated, the coil assembly 14 includes the high voltage transformer 58 which has the primary coil 92 connected to the connector pins 74 and 76 of the male electrical connector 86 and the secondary coil 94 which has one end connected to ground and the other end connected to the electrical terminal 50 of the spark plug 12.

The capacitor 95 formed by the metal electrode 60 within the coil assembly 14 and the metal shield 20 is connected between the end of the secondary coil 94 connected to the spark plug 12 and ground as previously described.

The sensor circuit 82 consists of a coupling capacitor 96 having one electrode connected to one end of the primary coil 92 and the other end connected to a junction between a resistor 98 and an inductor 100. The opposite end of the resistor 98 is connected to ground while the opposite end of the inductor 100 is connected to one electrode of a capacitor 102. The inductor 100 and the capacitor 102 form a high frequency filter which blocks the low frequency signals generated during the charging of the primary coil 92 and passes the high frequency signals generated across the primary coil 92 when the spark plug 12 generates a spark.

This frequency discrimination prevents the generation of false spark confirmation signals during the charging of the primary coil 92.

The other electrode of the capacitor 102 is connected to the cathode of a diode 104, the anode of a diode 106 and to ground through a resistor 108. The anode of the diode 104 is connected to ground and the cathode of the diode 106 is connected to the gate of a field effect transistor (FET) 110 and to ground through a capacitor 112, a resistor 114, and a Zener diode 116. The source of the FET 110 is connected to ground while the drain is connected to the connector pin 84 of the male electrical connector 86 of the coil assembly 14 and to ground through a Zener diode 118.

Figure 6:
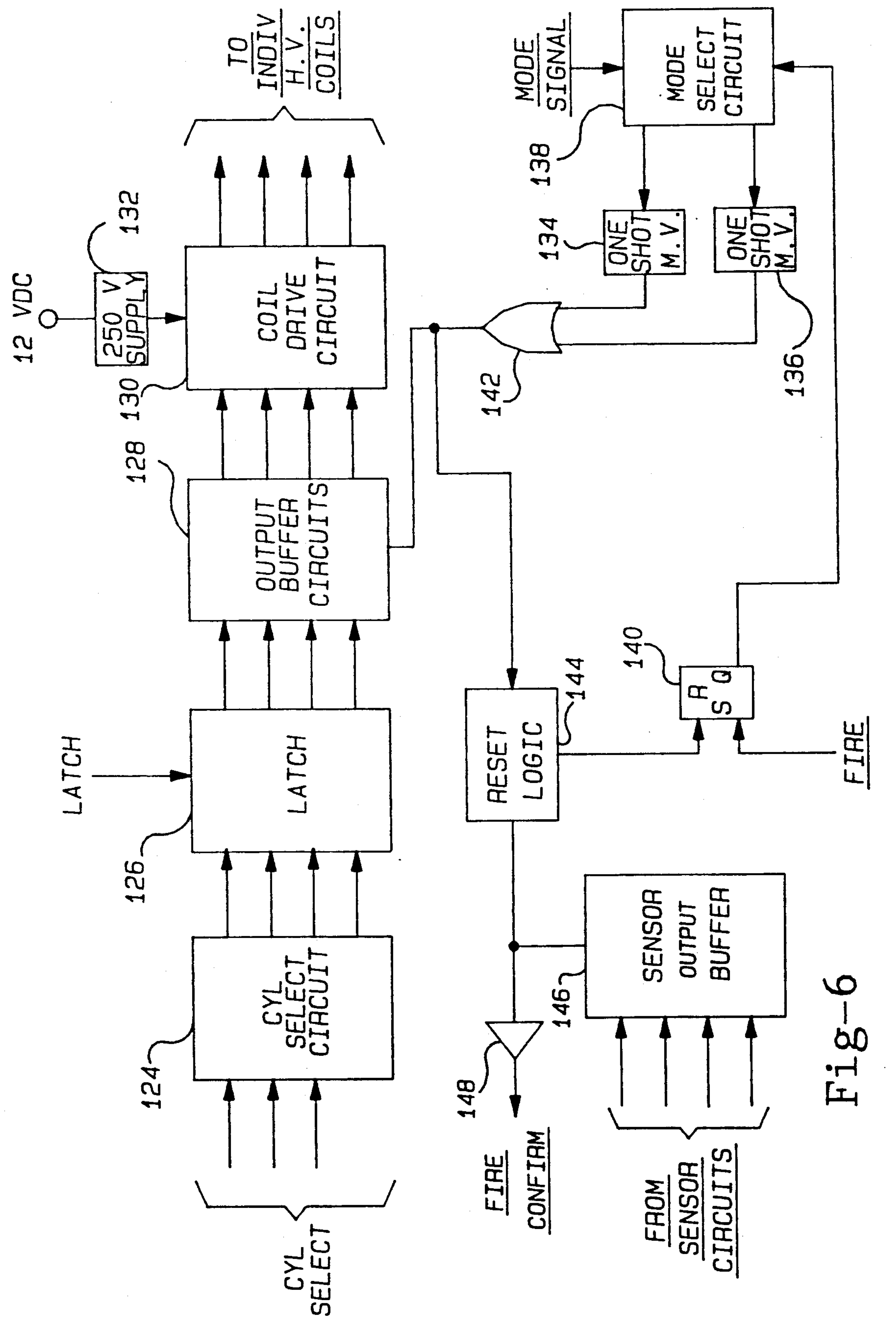
FIG. 6 is a block diagram showing the details of the ignition module 16.

The connector pin 84 is connected to the base of a transistor 120 through a resistor 122 in the ignition module 16 as shown. The transistor 120 and the resistor 122 constitute a buffer amplifier which is part of a sensor output buffer 146 of the ignition module 16 as shown in FIG. 6.

In operation, a 250 V pulse is applied across the primary coil 92 of the high voltage transformer 58 which induces a high voltage in the secondary coil 94. The high voltage across the secondary coil 94 increases rapidly until a spark is generated across the electrodes of the spark plug 12. When a spark is generated, the energy stored in the secondary coil 94 is rapidly discharged which in turn induces a high frequency signal across the primary coil 92. The coupling capacitor 96 connected to the primary coil 92 couples this high frequency signal to ground through the resistor 98. A signal corresponding to the high frequency signal induced in the primary coil 92 is thus generated across the resistor 98. The inductor 100 and capacitor 102 form a tuned circuit which is tuned to the frequency band of the high frequency signal induced in the primary coil 92 in response to a spark being generated by the spark plug 12. The tuned circuit effectively blocks or significantly reduces signals having frequencies higher or lower than the frequency band to which the inductor 100 and capacitor 102 are tuned.

The capacitor 102, diode 104, and diode 106 perform rectification and voltage doubling of the high frequency signal passed by the inductor 100 and capacitor 102. The capacitor 112 and resistor 114 form a R-C circuit to increase the duration of the signal passed by the diode 106. The voltage generated across the resistor 114 biases the FET 110 into a conductive state.

The Zener diode 116 limits the maximum voltage applied to the gate of the FET 110 and effectively controls the length of time the FET 110 will remain conductive after termination of the spark independent of the magnitude of the signal generated across the primary coil 92 by the discharge of the secondary coil 94. Preferably, the FET 110 will be biased to the conductive state for approximately 50 microseconds. The Zener diode 118 protects the FET 110 from inductive flyback voltage spikes that may be induced in the wire connecting the coil assembly 14 to the ignition module 16 and protects the FET 110 from static charges that may be developed in the wire connected to the connector pin 84 when it is not connected to the ignition module 16.

The conductive state of the FET 110 renders the transistor 120 in the ignition module 16 conductive. In its conductive state, the transistor 120 produces a 50 microsecond spark confirmation signal within the ignition module 16 indicating a spark has been generated by the spark plug 12. This spark confirmation signal is subsequently transferred to the engine control computer 18 for control and diagnostic purposes as previously described.

Although the preferred embodiment of the sensor circuit 82 uses the inductor 100 and capacitor 102 to form a tuned high frequency filter, those skilled in the art will recognize that the inductor 100 may be replaced with a resistor forming in conjunction with the capacitor 102 a high pass RC filter network which functionally is equivalent to the high frequency filter shown in FIG. 5.

Figure 10:
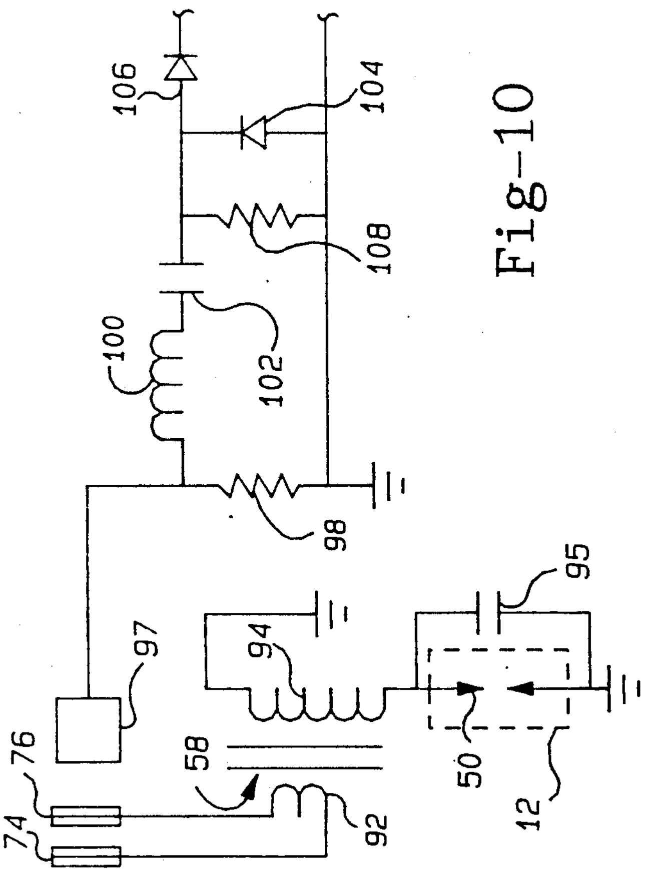
FIG. 10 is a partial circuit diagram showing an alternate embodiment of the electrical circuit.

An alternate embodiment of the sensor circuit 82 is shown in FIG. 10. In this embodiment of the sensor circuit, the coupling capacitor 96 is replaced by an RF signal detector element 97 such as a metal strip or metal rod disposed in or adjacent to the high voltage transformer 58. The detector element 97 is electrically insulated from the primary and secondary coils 92 and 94, respectively, of the high voltage transformer 58 and functionally is an antenna responsive to the RF signals induced in the high voltage transformer by the spark plug 12 generating a spark. The detector element 97 is connected directly to the junction between the resistor 98 and the inductor 100. As in the embodiment shown in FIG. 5, the inductor 100 in conjunction with the capacitor 102 forms a high frequency filter which blocks the lower RF frequency signals generated during the charging of the primary coil 92 and passes to the FET transistor 110 the high frequency signals induced in the high voltage transformer 58 when a spark is generated by its associated spark plug. As discussed relative to FIG. 5, the high frequency filter consisting of the inductor 100 and capacitor 102 may be replaced by a high frequency pass RC filter network.

The remainder of the sensor circuit, not shown, consists of the FET transistor 110, capacitor 112, resistor 114, and Zener diodes 116 and 118 as shown in FIG. 5. The operation of the sensor circuit shown in FIG. 10 is substantially identical to the operation of the sensor circuit 82 shown in FIG. 5. Again, the key element of the sensor circuit shown in FIG. 10 is the high frequency filter which discriminates between the RF signals induced in the high voltage transformer as the result of a spark being generated by the spark plug and the lower frequency RF signals induced in the high voltage transformer by other sources.

FIG. 6 is a block diagram showing the details of the ignition module 16. The ignition module 16 has the capability to generate an ignition drive pulse signal or a knock test signal. The ignition drive pulse signal has a pulse width or pulse duration sufficient for the high voltage transformer 58 to generate a voltage which will cause the spark plug 12 to generate a spark. The knock test signal has a duration selected to cause the high voltage transformer 58 to generate a high voltage probe signal across the spark plug electrodes which is less than the voltage required to produce a spark under normal engine operating conditions. However, in the event of auto or pre-ignition, commonly referred to as "engine knock", ions are generated within the cylinder which reduces the resistance between the electrodes of the spark plug 12. Therefore, if the conditions in the engine cylinder are conducive to auto or pre-ignition, the spark plug 12 will produce a spark in response to the high voltage probe signal. In response to a spark being generated, the sensor circuit 82 will generate a spark confirmation signal which is passed to the engine control computer 18 for control and diagnostic purposes. As previously indicated, if the conditions in the cylinder are not conducive to auto or pre-ignition, no spark will be generated by the spark plug 12 in response to the high voltage probe signal.

Referring to FIG. 6, the ignition module 16 has a cylinder select circuit 124 which decodes the signal generated by the engine control computer 18 indicative of which spark plug 12 is to be fired. The cylinder select circuit 124 has a plurality of output lines which are connected to a latch 126. Each output line is associated with one spark plug 12. The cylinder select circuit 124 will generate a signal on the output line associated with the spark plug 12 identified by the coded signal received from the engine control computer 18. The latch 126 will store the signal generated by the cylinder select circuit 124 and enable a specific buffer amplifier in an output buffer circuit 128. The output buffer circuit 128 has a separate buffer amplifier associated with each spark plug 12. When enabled, the buffer amplifier will transmit a received ignition pulse to an associated coil drive amplifier in a coil drive circuit 130. The coil drive circuit 130 has a separate coil drive amplifier for each spark plug 12 which is connected to the primary coil 92 of the high voltage transformer 58 of the associated coil assembly 14. The coil drive amplifiers receive electrical power from a 250 V supply of electrical power 132 and produce a 250 V ignition drive pulse which is applied to the primary coil 92 of the associated high voltage transformer 58 as indicated relative to FIG. 5.

The ignition drive pulses are generated by a one shot multivibrator 134 and the knock test pulses are generated by a one shot multivibrator 136. A mode select circuit 138 enables either the multivibrator 134 or 136 in response to a mode signal generated by the engine control computer 18 and an enable signal received from the Q output of an R-S flip-flop 140. The mode select circuit 138 identifies which multivibrator 134 or 136 is to be enabled and the enable signal initiates the generation of the ignition drive pulse or the knock test pulse by the multivibrators 134 and 136, respectively. The R-S flip-flop 140 generates the enable signal at its Q output in response to receiving a "fire" signal generated by the engine control computer 18 at its SET input. As is known in the art, the engine control computer 18 has the capability of computing the precise time when the spark plug 12 is to be fired from predetermined engine operating parameters such as engine load, engine speed, and engine temperature.

The one shot multivibrator 134 generates an ignition drive pulse signal having a pulse width or pulse duration selected to allow the high voltage transformer 58 to generate a voltage sufficient to cause the spark plug 12 to produce a spark under normal operating conditions within the cylinder. Preferably, the pulse width of the ignition drive pulse signal should be in the range between 4 to 5 microseconds. The multivibrator 136 generates a knock test pulse signal having a much shorter pulse width which is selected to allow the high voltage transformer 58 to generate a peak voltage which is below the voltage required by the spark plug 12 to produce a spark under normal operating conditions within the cylinder, but sufficiently high to produce a spark when the conditions in the cylinder are conducive to auto or pre-ignition. Preferably, the pulse width of the knock test pulse is in the range from 0.3 to 0.7 microseconds.

The ignition drive pulse generated by the multivibrator 134 or the knock test pulse generated by the multivibrator 136 is transferred to the coil drive amplifier in the coil drive circuit 130 through an OR gate 142 and the enabled output buffer amplifier of the output buffer circuit 128. The ignition drive pulse signal or the knock test signal is also transmitted to a reset logic circuit 144 signifying that an ignition drive pulse signal has been generated. The reset logic circuit 144 in response to the termination of an ignition drive pulse signal or a knock test signal will generate a reset signal which is applied to the RESET input of the R-S flip-flop 140. This reset signal will reset the R-S flip-flop 140 terminating the enable signal generated at its Q output and preventing the generation of a subsequent ignition drive pulse signal or knock test signal by the multivibrator 134 or 136, respectively, until the engine control computer 18 generates the next "fire" signal.

The output of the sensor circuit 82 embodied in each coil assembly 14 is received by the sensor output buffer 146, as previously indicated. The sensor output buffer 146 has a plurality of buffer amplifiers, such as the transistor 120 and its associated circuitry as shown in FIG. 5. The sensor output buffer 146 has a buffer amplifier associated with each coil assembly 14. The output of the sensor output buffer 146 is transmitted directly to the reset logic circuit 144 and to the engine control computer 18 through an amplifier 148. The output of the amplifier 148 is a "spark confirmation signal" which signifies to the engine control computer 18 that a spark has been generated by the spark plug 12. The spark confirmation signal may be used by the engine control computer 18 for control or diagnostic purposes. Since the "mode" signal is generated by the engine control computer 18, the engine control computer 18 knows if the spark plug 12 is fired in response to an ignition drive pulse signal or a knock test signal.

The output signal generated by the sensor output buffer 146 will also enable the reset logic circuit 144 to generate a reset signal which will reset the R-S flip-flop 140. In this manner, the R-S flip-flop 140 can be reset in response to detecting the generation of a spark or in response to the end of an ignition drive pulse signal or a knock test signal.

The ignition module 16 is compatible with either single strike or multi-strike modes of operation. In the single strike mode of operation, a single "fire" signal is generated for each spark plug 12 during each operational cycle of the engine. In the multi-strike mode of operation, as is known in the art, the engine control computer 18 will generate two or more "fire" signals in rapid succession during each combustion cycle for each cylinder. This causes multiple firings of the spark plug during the combustion cycle of each cylinder which enhances the combustion of the air fuel mixture and increases the efficiency of the engine.

In the knock detection mode of operation, in which the one shot multivibrator 136 generates knock test pulses, the engine control computer 18 may generate a single "fire" signal for each spark plug 12 during each operational cycle of the engine. However, it is preferred that multiple knock test pulses be generated during each combustion cycle of each cylinder. This will permit the detection of auto or pre-ignition conditions in the cylinder at various times during the combustion cycle.

The details of the female connector 46 are shown in FIGS. 7 through 9. The female connector 46 has a central body portion 152 from which extends a connector socket portion 154. The connector socket portion 154 is receivable in the male electrical connector 86. Pin sockets 156 which are engaged by the connector socket portion 154 receive the plurality of connector pins 74, 76, and 84 when the socket portion 154 is inserted in the male electrical connector 86 as shown in FIG. 9. The pin sockets 156 are respectively, connected to the connector wires 22, 24 and 26 which connect the coil assembly 14 to the ignition module 16 as shown in FIG. 1. An extraction ring 158 is formed integral with the central body portion 152 of the female connector 46. The extraction ring 158 has an aperture 160 through which a finger may be inserted to extract the coil assembly from the metal sleeve.

A pair of flexible lock tabs 162 are formed integral with the central body portion 152 on opposite sides of the connector socket portion 154. Each lock tab 162 has a rectangular aperture 164 provided therethrough as shown in FIG. 8. Functionally, the rectangular apertures 164 are dog catches arranged to be engaged by the dogs 88 provided on the external surfaces of the male electrical connector 86 when the connector socket portion 154 of the female electrical connector 46 is inserted in the male electrical connector 86 as shown in FIG. 9. In this state, the rectangular apertures 164 of the lock tabs 162 are engaged with the dogs 88 and lock the female electrical connector 46 in the male electrical connector 86 and permit the coil assembly 14 to be removed from the metal shield 20 by pulling on the extraction ring 158.

After the coil assembly 14 is removed from the metal shield 20, the female connector 46 may be disconnected from the coil assembly 14 by spreading the lock tabs 162 until the rectangular apertures 164 are disengaged from the dogs 88. The extraction ring 158 provides a simple, convenient means for removing the coil assembly 14 from the metal shield 20.

It is not intended that the invention be limited to the specific embodiment shown in the drawings and discussed in the specification. It is recognized that those skilled in the art may make changes to the disclosed direct fire ignition system within the scope of the invention as described herein and set forth in the claims.

What is claimed is:

1. A direct fire ignition system for an internal combustion engine having at least one cylinder, a spark plug associated with said at least one cylinder to ignite an air fuel mixture within said at least one cylinder, and an engine computer control responsive to the operational parameters of said internal combustion engine for generating a fire signal at a time calculated to optimize ignition of said air fuel mixture by said spark plug, said direct fire ignition system comprising:

ignition module means responsive to said fire signal generated by said engine computer control for generating an ignition drive pulse signal;

a coil assembly mounted directly on said spark plug, said coil assembly having a primary coil energized by said ignition drive pulse signal and a secondary coil inducing a high voltage across said spark plug sufficient to cause said spark plug to generate a spark under normal operating conditions in response to said primary coil being energized by said ignition drive pulse signal generated by said ignition module means; and spark sensor means for generating a spark confirmation signal in response to signals within a predetermined frequency range being induced in said primary coil when a spark is generated by said spark plug.

2. The direct fire ignition system of claim 1 wherein said spark sensor means comprises:

a band pass filter capacitively coupled to said primary coil, said band pass filter passing high frequency signals in said predetermined frequency range induced in said primary coil in response to a spark being generated by said spark plug;

means for rectifying said high frequency signals passed by said band pass filter to produce a rectified signal; and means for amplifying said rectified signal to generate said spark confirmation signal.

3. The direct fire ignition system of claim 2 wherein said band pass filter is a high frequency band pass filter.

4. The direct fire ignition system of claim 3 wherein said high frequency band pass filter comprises a serially connected inductor and a capacitor.

5. The direct fire ignition system of claim 2 wherein said means for rectifying said high frequency signals includes voltage doubler means for doubling the voltage of said rectified signal and means for extending the length of time which said rectified signal maintains said means for amplifying in a conductive state so that said spark confirmation signal generated by said means for amplifying has a predetermined pulse duration.

6. The direct fire ignition system of claim 2 wherein said means for rectifying comprises:

a first diode connected between said band pass filter and said means for amplifying to rectify said high frequency signals passed by said band pass filter;

a second diode connected between said first diode and ground;

a Zener diode connected to the junction between said Zener diode and said means for amplifying to limit the maximum voltage of said rectified high frequency signal; and a resistance-capacitance network connected in parallel with said Zener diode to extend the length of time said rectified high frequency signals maintain said means for amplifying in a conductive state so that said spark confirmation signal has a predetermined pulse width.

7. The direct fire ignition system of claim 6 wherein said means for amplifying is a field effect transistor whose gate is connected to the cathode of said first diode.

8. The direct fire ignition system of claim 6 wherein said predetermined pulse width of said spark confirmation signal is between 40 and 60 microseconds.

9. The direct fire ignition system of claim 1 wherein said ignition module means further comprises buffer amplifier means for transferring said spark confirmation signal to said engine computer control.

10. The direct fire ignition system of claim 1 wherein said ignition module means further comprises means for alternatively generating a knock test pulse signal in response to said fire signal generated by said engine computer control and a mode signal indicating a knock test pulse signal is to be generated, said knock test pulse signal energizing said coil assembly to generate a probe voltage across said spark plug having a peak value less than the value required by said spark plug to generate a spark under normal operating conditions but sufficiently high to cause said spark plug to generate a spark when the conditions in said at least one cylinder are conducive to auto-ignition.

11. A direct fire ignition system for an internal combustion engine having at least one cylinder, a spark plug associated with said at least one cylinder, said spark plug having a a pair of spatially separated electrodes between which a spark is generated to ignite an air fuel mixture within said at least one cylinder, and an engine computer control responsive to operational parameters of said internal combustion engine for generating a fire at a time calculated to optimize the ignition of said air fuel mixture by said spark plug, said direct fire ignition system comprising:

ignition module means responsive to said fire signal for generating an ignition drive pulse signal;

a coil assembly mounted directly on said spark plug, said coil assembly having a primary coil energized by said ignition drive pulse signal and a secondary coil inducing a high voltage sufficient to cause a spark to be generated between said spatially separated electrodes in response to said primary coil being energized, said secondary coil having a high voltage output end connectable to one of said pair of spatially separated electrodes;

a capacitor connected between said high voltage output end of said secondary coil and a common ground; and spark sensor means for generating a spark confirmation signal in response to signals within a predetermined frequency range being induced into said primary coil when a spark is generated by said spark plug.

12. The direct fire ignition system of claim 11 wherein said engine has a cylindrically shaped metal sleeve circumscribing said spark plug, said coil assembly has a cylindrically shaped non-conductive housing slidably received in said cylindrically shaped metal sleeve, said capacitor comprising a first electrode disposed on the internal surface of said cylindrically shaped non-conductive housing which is connected to said high voltage output end of said secondary coil and wherein said cylindrically shaped metal sleeve constitutes a second electrode of said capacitor.

13. The direct fire ignition system of claim 12 wherein said spark sensor means comprises:

a high frequency pass filter capacitively coupled to said primary coil, said high frequency pass filter passing high frequency signals in said predetermined frequency range induced in said primary coil in response to a spark being generated by said spark plug;

means for amplifying a rectified signal;

a diode connected between the output of said high frequency pass filter and an input to said means for amplifying which rectifies said high frequency signals passed by said high frequency pass filter to generate said rectified signal;

a Zener diode connected to said diode for limiting the maximum voltage of said rectified signal; and an R-C network connected in parallel with said Zener diode to extend the length of time said rectified signal maintains said means for amplifying in a conductive state so that said spark confirmation signal has a predetermined pulse width.

14. The direct fire ignition system of claim 13 wherein said high frequency pass filter is an inductance-capacitance high frequency band pass filter.

15. The direct fire ignition system of claim 11 wherein said spark sensor means comprises:

a high frequency pass filter capacitively coupled to said coil assembly for passing high frequency signals in said predetermined frequency range which are induced in said primary coil in response to a spark being generated by said spark plug;

voltage doubling means for rectifying said high frequency signals passed by said high frequency pass filter to generate a rectified signal; and amplifier means for amplifying said rectified signal to generate said spark confirmation signal.

16. The direct fire ignition system of claim 15 wherein said amplifier means includes means for extending the duration of said spark confirmation signal to have a predetermined pulse width.

17. The direct fire ignition system of claim 15 further comprising a capacitor coupling said high frequency pass filter to said coil assembly.

18. The direct fire ignition system of claim 15 further comprising a detection element capacitively responsive to the RF signals induced in said primary coil, said detection element being connected to said high frequency pass filter.

19. A direct fire ignition system for an internal combustion engine having a plurality of cylinders and wherein each cylinder of said plurality of cylinders has its own spark plug and wherein said engine further has an engine computer control which generates a fire signal and a coded signal identifying the cylinder in which the air fuel mixture is to be ignited, said direct fire ignition system comprising: p1 a coil assembly mounted directly on each of said spark plugs, each of said coil assemblies having a primary coil energized by an ignition drive pulse signal and a secondary coil generating a high voltage in response to said primary coil being energized, said high voltage being sufficient to cause said spark plug to generate a spark;

a cylinder select circuit having an output associated with each cylinder of said plurality of cylinders, said cylinder select circuit responsive to said coded signal generated by said engine computer control to generate a signal on said output associated with said cylinder of said plurality of cylinders identified by said coded signal;

first means for generating a first pulse signal having a first predetermined pulse width in response to said fire signal generated by said engine computer control;

a plurality of coil drive amplifiers, each coil drive amplifier of said plurality of coil drive amplifiers associated with a respective one of said plurality of cylinders, each coil drive amplifier of said plurality of coil drive amplifiers having its output connected to said coil assembly attached to said spark plug of its associated cylinder;

means connected to said output of said cylinder select circuit for enabling said coil drive amplifier of said plurality of coil drive amplifiers associated with said cylinder of said plurality of cylinders identified by said coded signal to generate said ignition drive pulse signal in response to said first pulse signal, said ignition drive pulse signal causing a spark to be generated by said spark plug of said selected cylinder of said plurality of cylinders; and spark sensor means for generating a spark confirmation signal in response to said primary coil generating signals within a predetermined frequency range when a spark is generated by its associated spark plug.

20. The direct fire ignition system of claim 19 wherein said first means for generating said first pulse signal is a first one shot multivibrator which produces said first pulse signal in response to said fire signal generated by said engine computer control.

21. The direct fire ignition system of claim 20 wherein said first predetermined pulse width of said first pulse signal is between 4 and 6 microseconds.

22. The direct fire ignition system of claim 20 wherein said first predetermined pulse width of said first pulse signal is approximately 5 microseconds.

23. The direct fire ignition system of claim 20 further comprising ignition module means having a sensor output buffer for transmitting said spark confirmation signals to said engine computer control and a reset logic circuit for generating a reset signal in response to at least one of said first pulse signal and said spark confirmation signal, said first means for generating said first pulse signal further including an R-S flip flop having a SET input receiving said fire signal, a RESET input receiving said reset signal and a Q output connected to said first one shot multivibrator.

24. The direct fire ignition system of claim 23 wherein said engine computer control further generates a mode signal indicating a knock test signal is to be generated, said ignition module means further comprising:

second means for generating a second pulse signal having a second predetermined pulse width in response to said fire signal and mode signal generated by said engine computer control;

a mode select circuit for transmitting said fire signal to said first means for generating said first pulse signal in the absence of said mode signal and for transmitting said ignition drive pulse signal to said second means for generating said second pulse signal in response to said mode signal; and gate means for transmitting said first and second pulse signals to said coil drive amplifiers.

25. The direct fire ignition system of claim 24 wherein said first means for generating is a first one shot multivibrator which produces said first pulse signal in response to said fire signal and wherein said first predetermined pulse width is selected to enable said coil drive amplifier associated with said selected cylinder to generate an ignition drive pulse signal having a pulse duration sufficient for said associated coil assembly to generate a high voltage causing said spark plug to generate a spark under normal operating conditions of said internal combustion engine, and wherein said second means for generating is a second one shot multivibrator which produces said second pulse signal in response to said fire signal, and wherein said second predetermined pulse width is selected to enable said coil drive amplifier associated with said selected cylinder to generate a knock test signal having a pulse duration sufficient for said associated coil assembly to generate a high voltage having a peak value below the value required to cause said spark plug to generate a spark under normal operating conditions of said cylinder and above the value required to cause said spark plug to generate a spark when the conditions in said selected cylinder are conducive to auto-ignition.

26. The direct fire ignition system of claim 24 wherein said first predetermined pulse width is between 4 and 6 microseconds and said second predetermined pulse width is between 0.4 and 0.6 microseconds.

27. The direct fire ignition system of claim 24 wherein said first predetermined pulse width is approximately 5 microseconds and said second predetermined pulse width is approximately 0.5 microseconds.

28. The direct fire ignition system of claim 25 wherein said ignition module means further includes a reset circuit for generating a reset signal in response to either of said first and second pulse signals and a flip flop circuit, said flip flop circuit having a SET input receiving said fire signal, a RESET input receiving said reset signal and a Q output connected to said mode select circuit, said Q output of said flip flop corresponding to said fire signal.

29. The direct fire ignition system of claim 26 wherein said ignition module means further includes a sensor output buffer for transmitting said spark confirmation signals to said engine computer control, said sensor output buffer further transmitting said spark confirmation signals to said reset logic circuit, and wherein said reset logic circuit further generates said reset signal in response to receiving said spark confirmation signal.

30. A direct fire ignition system for an internal combustion engine having a plurality of cylinders, a spark plug associated with each cylinder for generating a spark to ignite an air fuel mixture in its associated cylinder, and an engine computer control responsive to the operational parameters of said internal combustion engine for generating a coded signal identifying the next cylinder whose spark plug is to be fired and for generating a fire signal at a time when a spark should be generated by said spark plug associated with said identified cylinder to optimize the efficiency of said internal combustion engine, said direct fire ignition system comprising:

a coil assembly mounted directly on each said spark plug, said coil assembly having a primary coil and a secondary coil for generating a high voltage sufficient to cause each said spark plug to generate a spark under normal operating conditions of said cylinder in response to said primary coil being energized by an ignition drive pulse signal and spark sensor means for generating a spark confirmation signal in response to signals within a predetermined frequency range being induced in said primary coil when a spark is generated by each said spark plug: and ignition module means responsive to said coded signal identifying said cylinder whose spark plug is to be fired and said fire signal for generating said ignition drive pulse signal which is transmitted to said coil assembly attached to said spark plug associated with said cylinder identified in said coded signal.

31. The direct fire ignition system of claim 30 wherein each said spark plug has at least one electrode and said secondary coil has a high voltage output, said coil assembly further comprising a capacitor connected between said high voltage output of said secondary coil and a common ground.

32. The direct fire ignition system of claim 31 wherein said coil assembly has a cylindrically shaped hollow non-conductive housing which is slidably receivable in a cylindrically shaped metal sleeve attached to said internal combustion engine concentric with said spark plug, said capacitor comprising a first electrode disposed on the internal surface of said hollow non-conductive housing, said first electrode being connected to said high voltage output of said secondary coil; and wherein said cylindrically shaped metal sleeve constitutes a second electrode of said capacitor which is connected to said common ground through said internal combustion engine.

33. The direct fire ignition system of claim 30 wherein said spark sensor means comprises:

a high frequency pass filter capacitively coupled to said primary coil, said high frequency pass filter passing high frequency signals in said predetermined frequency range induced in said primary coil in response to a spark being generated by said spark plug;

means for rectifying said high frequency signals in said predetermined frequency range to generate a rectified signal; and means for amplifying said rectified signal to generate said spark confirmation signal.

34. The direct fire ignition system of claim 33 wherein said high frequency pass filter is a high frequency band pass filter.

35. The direct fire ignition system of claim 33 wherein said means for amplifying said rectified signal includes means for extending the length of said spark confirmation signal to have a predetermined pulse width.

36. The direct fire ignition system of claim 35 wherein said predetermined pulse width of said spark confirmation signal is approximately 50 microseconds.

37. The direct fire ignition system of claim 31 wherein said ignition module means further comprises means for alternatively generating a knock test pulse signal in response to said coded signal identifying said cylinder whose spark plug is to be fired, said fire signal and a mode signal indicative of a request to conduct a knock test, said knock test pulse signal energizing said primary coil of said coil assembly attached to said spark plug associated with said cylinder identified by said coded signal to generate a knock test voltage applied to said at least one electrode of said spark plug having a peak value less than the value required by said spark plug to generate a spark under normal operating conditions within said cylinder but sufficiently high to cause said spark plug to generate a spark when the conditions in said cylinder identified by said coded signal are conducive to auto and pre-ignition.

38. The direct fire ignition system of claim 37 wherein said ignition module means comprises:

a cylinder select circuit responsive to said coded signal for generating a selected cylinder signal identifying said cylinder whose spark plug is to be fired;

pulse generator means for generating a first pulse signal having a first predetermined pulse width in response to said fire signal and the absence of said mode signal and for generating a second pulse signal having a second predetermined pulse width in response to said fire signal and said mode signal;

a plurality of coil drive amplifiers, each coil drive amplifier of said plurality of coil drive amplifiers associated with a respective one of said plurality of cylinders, each of said coil drive amplifiers having its output connected to said respective coil assembly attached to said spark plug of its associated cylinder, each coil drive amplifier generating said ignition drive pulse signal in response to said first pulse signal and generating said knock test pulse signal in response to said second pulse signal; and means connected between said cylinder select circuit and said plurality of coil drive amplifiers for enabling said coil drive amplifier associated with said cylinder identified by said selected cylinder signal to generate said ignition drive pulse signal in response to said first pulse signal and to generate said knock test pulse signal in response to said second pulse signal.

39. The direct fire ignition system of claim 38 wherein said pulse generator means comprises:

a first one shot multivibrator for generating said first pulse signal in response to said fire signal;

a second one shot multivibrator for generating said second pulse signal in response to said fire signal; and a mode select circuit having a first state applying said fire signal to said first one shot multivibrator and switchable to a second state applying said fire signal to said second one shot multivibrator in response to said mode signal.

40. The direct fire ignition system of claim 39 wherein said pulse generator means further comprises a reset circuit for generating a reset signal in response to said first one shot multivibrator generating said first pulse signal or said second one shot multivibrator generating said second pulse signal and a flip flop circuit, said flip flop circuit having a SET input receiving said fire signal, a RESET input receiving said reset signal and a Q output connected to said mode select circuit, said Q output corresponding to said fire signal received at said SET input.

41. The direct fire ignition system of claim 39 wherein said first predetermined pulse width of said first pulse signal is approximately 5 microseconds wide and wherein said second predetermined pulse width of said second pulse signal is approximately 0.5 microseconds wide.

42. The direct fire ignition system of claim 40 wherein said ignition module means further comprises a sensor output buffer for transmitting said spark confirmation signals to said engine computer control.

43. The direct fire ignition system of claim 42 wherein said reset circuit is responsive to the output of said sensor output buffer to generate said reset signal.

44. A coil assembly for a direct fire ignition system for an internal combustion engine, wherein said internal combustion engine has at least one spark plug and a grounded cylindrical metal sleeve circumscribing said at least one spark plug, said coil assembly comprising:

a non-conductive plastic cylindrically shaped housing slidably received in said metal sleeve;

an electrical contact provided at one end of said housing which is adapted to make electrical contact with a central electrode of a spark plug when said housing is received in said metal sleeve;

a high voltage transformer disposed in said housing, said high voltage transformer having a primary coil and a secondary coil, said secondary coil having a high voltage output connected to said electrical contact;

a conductive electrode disposed along a portion of an internal surface of said cylindrically shaped housing, said conductive electrode connected to said high voltage output of said secondary coil and forming in conjunction with said metal sleeve a capacitor between said high voltage output of said secondary coil and ground;

a spark sensor circuit electrically coupled to said high voltage transformer for generating a spark confirmation signal in response to high frequency signals in a predetermined frequency range being induced in said high voltage transformer in response to said at least one spark plug to which said coil assembly is electrically attached generating a spark, said high frequency signals in said predetermined frequency range uniquely identifying that said at least one spark plug generated a spark; and an end cap enclosing the end of said housing opposite said conductive electrode, said end cap including a male electrical connector having at least three electrical terminal pins, two of said at least three electrical terminal pins being connected to the opposite ends of said primary coil and a third terminal pin of said at least three electrical terminal pins receiving said spark confirmation signal generated by said spark sensor circuit.

45. The coil assembly of claim 44 further comprising a resilient boot connected to said one end of said cylindrically shaped housing which sealingly engages the external surface of a ceramic electrical insulator surrounding said conductive electrode of said at least one spark plug when said electrical contact is engaged with said central electrode.

46. The coil assembly of claim 44 wherein said spark sensor circuit comprises:

a band pass filter capacitively coupled to said primary coil, said band pass filter electrically tuned to pass said high frequency signals in said predetermined frequency range and significantly attenuate said high frequency signals outside said predetermined frequency range;

rectifier means connected to said band pass filter for rectifying said high frequency signals in said predetermined frequency range to generate a rectified signal; and amplifier means for generating said spark confirmation signal in response to said rectified signal.

47. The coil assembly of claim 46 wherein said amplifier means comprises:

a field effect transistor having a gate receiving said rectified signal; and means for extending the time said field effect transistor is maintained in a conductive state independent of the duration in which said high frequency signals are generated by said at least one spark plug generating a spark to generate said spark confirmation signal having a predetermined pulse width.

48. The coil assembly of claim 47 wherein said means for extending the time said field effect transistor is maintained in a conductive state maintains said field effect transistor in a conductive state for approximately 50 microseconds.

49. The coil assembly of claim 48 wherein said means for extending the time said field effect transistor is maintained in a conductive state is an R-C network connected to a gate of said field effect transistor and a Zener diode limiting the maximum voltage of said gate of said field effect transistor.

50. The coil assembly of claim 46 wherein said housing has at least one electrically conductive spring finger engaging said grounded cylindrical metal sleeve, said at least one electrically conductive spring finger extending into said housing to provide an electrical ground for one end of said secondary coil of said high voltage transformer, and an internal electrical ground for said spark sensor circuit within said housing.

51. The coil assembly of claim 44 further comprising a female electrical connector receivable in said male electrical connector, said female electrical connector comprising means for extracting said coil assembly from said grounded cylindrical metal sleeve.

52. The coil assembly of claim 51 wherein said end cap of said coil assembly has a pair of dogs, one disposed on either side of said male electrical connector, said female electrical connector comprising:

a central body portion having one end and an opposite end;

a socket portion extending from said one end of said central body portion, said socket portion slidably receivable in said male electrical connector;

at least three electrical terminal pin sockets disposed in said socket portion, each electrical terminal pin socket receiving a respective one of said at least three electrical terminal pins of said male electrical connector;

at least three connector wires, each connector wire connected to a respective one of said at least three electrical terminal pin sockets;

an extractor ring extending from said opposite end of said central body portion; and a pair of lock tabs extending from said central body portion on opposite sides of said socket portion and spaced therefrom, each lock tab of said pair of lock tabs having a dog catch provided therein which engages one dog of said pair of dogs when said socket portion is received in said male electrical connector to lock said female electrical connector to said coil assembly.

* * * * *

UNITED STATES PATENT AND TRADEMARK OFFICE

CERTIFICATE OF CORRECTION

PATENT NO. : 5,111,790

DATED : May 12, 1992

INVENTOR(S) : Mark E. Grandy

It is certified that error appears in the above-identified patent and that said Letters Patent is hereby corrected as shown below: On the Title page, item [57], In the ABSTRACT, line 7, delete "coupling" and insert ---- coupled ----.

Column 1, line 52, delete "conductive" and insert ---- conducive ----.

Column 2, line 24, delete "conductive" and insert ---- conducive ----.

Column 2, line 31, delete "conductive" and insert ---- conducive ----.

Column 12, line 58, "pl" and insert a paragraph indention.

Signed and Sealed this

Seventeenth Day of August, 1993

Attest:

Bruce Lehman

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : 5,111,790

DATED : May 12, 1992

INVENTOR(S) : Mark E. Grandy

It is certified that error appears in the above-identified patent and that said Letters Patent is hereby corrected as shown below:

In the ABSTRACT, line 7, delete "coupling" and insert --coupled --.

Column 1, line 52, delete "conductive" and insert --conducive --.

Column 2, line 24, delete "conductive" and insert --conducive --.
line 31, delete "conductive" and insert --conducive --.

Column 12, line 58, delete "pl" and insert a paragaph idention.

Signed and Sealed this

Seventh Day of December, 1993

Attest:

Bruce Lehman

BRUCE LEHMAN

*Attesting Officer*

*Commissioner of Patents and Trademarks*